United States Patent [19]
Moyers, Jr.

[11] Patent Number: 5,943,296
[45] Date of Patent: Aug. 24, 1999

[54] AIMING POINT SYSTEM AND TECHNIQUE

[75] Inventor: Thomas E. Moyers, Jr., Woodbridge, Va.

[73] Assignee: The United States of America as represented by the Secretary of the Army, Washington, D.C.

[21] Appl. No.: 08/123,905

[22] Filed: Sep. 14, 1993

[51] Int. Cl.⁶ ........................................................ G01S 3/80
[52] U.S. Cl. ............................................. 367/116; 367/118
[58] Field of Search .................................... 367/118, 119, 367/120, 906, 116

[56] References Cited

U.S. PATENT DOCUMENTS 3,614,723  10/1971  Wedel .......................................... 367/120
4,629,834  12/1986  Waggoner et al. ......................... 367/199
4,967,641  11/1990  Chambre ..................................... 367/116
5,138,156   8/1992  Lee, III ....................................... 250/239

Primary Examiner—Ian J. Lobo
Attorney, Agent, or Firm—Milton W. Lee; Alain L. Bashore; Anthony T. Lane

[57] ABSTRACT

An aiming point system and technique for defining the aiming point of a data collection receiver used by an operator. A data receiver is directed to the aiming point for collecting and amplifying sub-audio signals emitted from rotary aircraft. The sub-audio signals are converted to audible signals by a voltage to frequency converter. The aiming point is readjusted manually or automatically in response to the sub-audible strength of the audible signal to obtain at least a substantial proportion of the target signature of the rotary type aircraft. The data collection receiver may include binoculars with a silicon photo detector and pre-amp within one of the binocular eyepieces.

3 Claims, 2 Drawing Sheets

AIMING POINT SYSTEM AND TECHNIQUE

BACKGROUND OF THE INVENTION

1. Field of the Invention

The present invention generally relates to signal quality optimization and more specifically, to a system and technique for defining the aiming point for a data collection receiver of a data collection system.

2. Description of Prior Art

The prior art system and method for the collection of data from rotary type aircraft has serious defects. When data was collected at least two operators were required, one for operating the equipment and a second, whom we shall call a tracker, for analyzing the test data and providing the results to the first operator to control any associated equipment. The test equipment by the tracker may use a signal spectrum analyzer, if desired, although it would not be entirely satisfactory due to the feedback time lag of approximately 2–3 seconds. This time lag causes holes in the data and consequently makes laboratory data reduction difficult and time consuming. Moreover, the main purpose of the system is to collect data on rotary aircraft, which may require covert operations, necessitating a system as small and inconspicuous as possible. Auxiliary test equipment is impractical.

The system was normally designed to detect and record the signal induced in the receiver as a result of the image of the rotor blade passing through the active area of the silicon detector built into the receiver. The field of view of the data collection receiver is very narrow relative to the field of view of the visible optics used by the operator to track the target. Without feedback from the data collection receiver, the operator has no indication that the device is operating, and has no feel for the quality of the signal being recorded.

While the prior art has reported signal quality optimization in data collection systems none have established a basis for a specific technique and device that is dedicated to the task of resolving the particular problem at hand.

What is needed in this instance is a technique and system for defining the useful aiming point of a data collection receiver thus allowing for the readjusting of the aiming point in response to the sub-audible strength of the audible signal to obtain at least a substantial proportion of the target signature of the rotary aircraft.

SUMMARY OF THE INVENTION

It is therefore one object of the invention to provide a feedback technique and system for defining the aiming point of a data collection receiver thus allowing for the readjusting of the aiming point in response to the sub-audible strength of the audible signal to obtain at least a substantial proportion of the target signature of the rotary aircraft.

According to the invention, there is disclosed herein a system and technique for defining the aiming point for a data collection receiver of a data collection system by an operator. A detector is directed at rotary type aircraft to receive target signals from the aiming point. Sub-audio returns are extracted from the output of the detector to acquire signal characteristics of the target. Amplification of the sub-audio signal returns occur, with a receiver coupled to the detector. The sub-audio returns are then converted to audible signals, which are a function of the sub-audio signals for the operator. Intensities of various audible signals are compared as a function of the aiming point by means of the operator. Readjustment of the aiming point in response to the sub-audible strength of the audible signal is then done to obtain at least a substantial proportion of the target signature of the rotary type aircraft.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1:
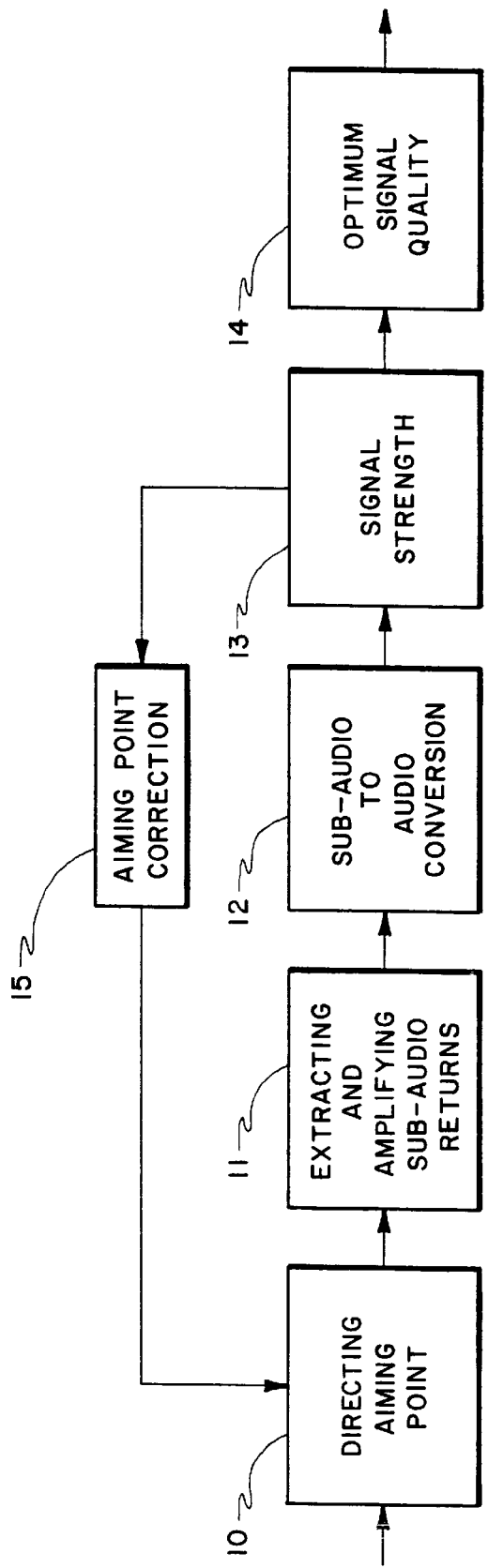
FIG. 1 is a block diagram of the technique utilized for defining the useful aiming point.

Referring now to FIG. 1, there is shown in block diagram the feedback technique steps of the present invention. An operator manually tracks a target and points a receiver at an aiming point defined as the point on the target intercepted by the optical axis, to different areas of the target in step 10 looking for appropriate signal returns. The technique and system of the present invention is appropriate for the detection of signals from rotary aircraft, and in the preferred embodiment to helicopters. Rotary aircraft is defined as an aircraft having an important part that rotates.

Figure 2:
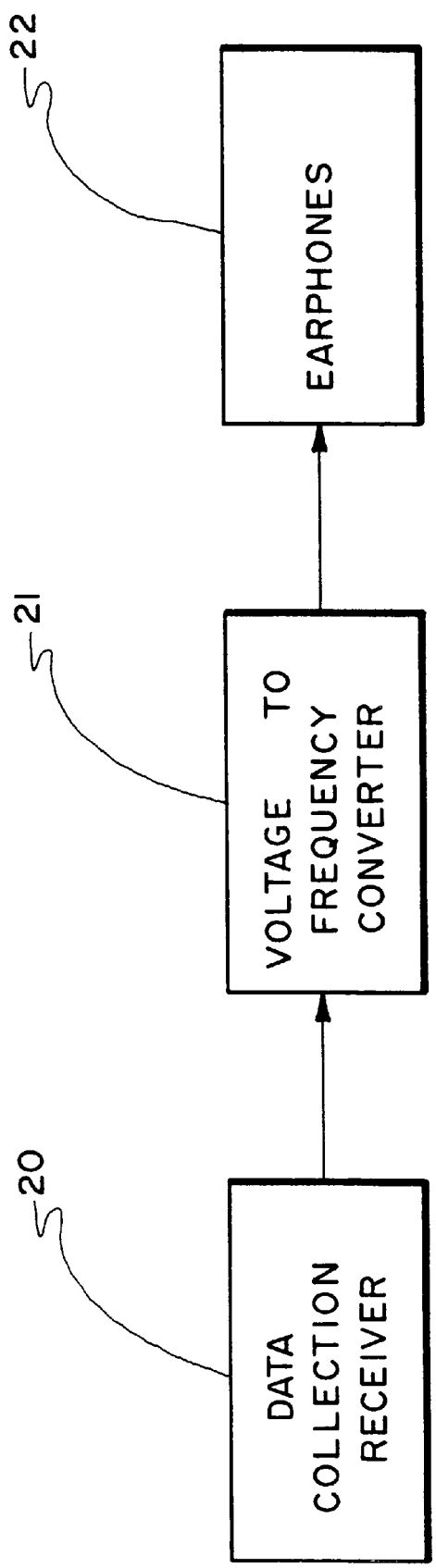
FIG. 2 is a block diagram of the system for defining the useful aiming point.

Most helicopters utilize a single multi-blade main rotor and a single multi-blade tail rotor. A departure from this norm are several helicopters that utilize different techniques to produce the anti-torque required, of which these characteristics are detectible by the data collection receiver 20 of FIG. 2. One such helicopter is the Russian KA-27. This helicopter uses dual counter rotating main rotors on a single shaft. The U.S. Army CH-47, uses separate main rotors on each end of the helicopter. A third different approach is the McDonnell-Douglas NOTAR. This helicopter uses a single main rotor without a visible tail rotor. Main rotor anti-torque is obtained to vent the output air flow in the direction needed to provide the necessary anti-torque to counter the main rotor torque.

Sub-audio signals are extracted from the output of a detector in step 11 of FIG. 1, where the detector output is from a hand-held data collection system. The sub-audio signal return is amplified with a receiver coupled to the detector which are then converted to an audio signal in step 12. The audio signal is a function of the sub-audible signal. The operator may hear the audible signals and thus uses the intensities of various audible signals as a function of the aiming point in step 13 which determines the optimum signal quality in step 14. The aiming point which is critical to the quality of data acquired is then readjusted in step 15 in response to the sub-audio strength of the audible signal to obtain at least a substantial proportion of the target signature of the rotary aircraft.

Any detected signals that might be useful in characterizing the helicopter are important to record. In most cases this amounts to only the main and tail rotors. However, with the appropriate receiver detector, the signature of other avionics equipment may be detected, especially the on-board forward-looking infrared (FLIR) system. With the provision of feedback to the operator, any extraordinary signals can be detected and recorded. Depending on the viewing aspect, different parts of the rotor system produce greater or lesser modulation in the receiver. The feedback would be used mainly in finding the "sweet spot" of both the main and tail rotor and when a signal is no longer present, aimless recording is prevented and operations can be terminated.

The recorded signals collected are analyzed in the laboratory via signal processing techniques, namely by Fast Fouier Transform calculations. It is important that the signal is not corrupted with Doppler shifts due to operator movement and signal dropouts due to inaccurate aiming. Also dead time due to lack of signal data is minimized because the operator is now aware when no signal is being collected. Thus there is instantaneous operator feedback thereby effecting continuous data monitoring thus allowing the operator an indication that a receiving device is operating and that signal quality is substantially maintained.

The indicator aiming point system utilizing the technique described above, is shown in block diagram in FIG. 2. A data collection receiver 20 receives appropriate signal returns from a hand-held data collection system. These signal returns are inputted to a voltage to frequency converter (VCO) 21 which converts the signal to an audible signal which is outputed to earphones 22 that is worn by the operator. Thus is the hand-held data collection system operator provided with real time acoustic feedback, allowing him to maintain optimum signal quality from the target during the data collection exercise. While the preferred embodiment utilizes an operator to provide a manual movement for the readjustment of aiming point, it is within the scope the present invention that the "operator" be an automatic control system which provides an automatic movement for the readjustment of the aiming point.

The handheld data collection system used with the system and technique of the present invention consists of a modified stabilized binocular system to include a reticule in one eyepiece and a silicon photo detector/pre-amp in the other. The binoculars are "Fujinon Stabiscope S1040". The "Stabliscope" is a 10 power binocular with built-in gyroscope for stabilizing the target to be observed. The binoculars were modified to be the data collection receiver by removing one eyepiece and installing a 0.2 millimeter silicon PIN detector and pre-amp in its place. A further description of the detector may be found in U.S. Pat. No. 5,138,156 entitled "Vibration Tolerant Infared Sensor for Aircraft" patented on Aug. 11, 1992, incorporated herein by reference. A crosshair was installed in the other eyepiece to provide an aiming aid for the operator. Included in the pre-amp is a circuit to roll-off those frequencies below 9 Hertz. The signal level is further amplified till detector noise is apparent, assuring the maximum collection range possible. Signal derived from much closer targets may overdrive the receiver, but this only causes harmonics to be generated which only serve to further qualify the actual rotor frequency during Fast Fourier Transform calculations. The output signal is then buffered and sent to the a miniature recorder worn on the operators belt.

While this invention has been described in terms of preferred embodiment consisting of data collection of helicopter targets, those skilled in the art will recognize that the invention can be practiced with modification within the spirit and scope of the appended claims.

Having thus described my invention, what I claim as new and desire to secure by Letters Patent is as follows:

1. A processing technique for defining the aiming point for a data collection receiver of a data collection system by an operator comprising the steps of:

directing a detector at rotary type aircraft to receive target signals from the aiming point;

extracting sub-audio returns from the output of the detector to acquire signal characteristics of the target;

amplifying sub-audio signal returns with a receiver coupled to the detector;

converting the sub-audio signals to audible signals, which are a function of the sub-audio signals;

comparing the intensities of various audible signals as a function of the aiming point;

readjusting the aiming point in response to the sub-audible strength of the audible signal to obtain at least a substantial proportion of the target signature of the rotary type aircraft.

2. A system for defining the aiming point for a data collection receiver of a data collection system by an operator comprising:

a data receiver directed to the aiming point for collecting and amplifying sub-audio signals emitted from rotary type aircraft;

converter means for converting the sub-audio signals to audible signals;

readjusting means for readjusting the aiming point in response to the sub-audible strength of the audible signal to obtain at least a substantial proportion of the target signature of the rotary type aircraft.

3. The aiming point indicator system of claim 2 wherein the data receiver includes a silicon photo detector and pre-amp both contained within a binocular eyepiece.

* * * * *